(12) United States Patent
Fukami

(10) Patent No.: US 10,884,296 B2
(45) Date of Patent: Jan. 5, 2021

(54) DISPLAY DEVICE

(71) Applicants: Panasonic Liquid Crystal Display Co., Ltd., Himeji (JP); PASONA KNOWLEDGE PARTNER INC., Osaka (JP)

(72) Inventor: Tetsuo Fukami, Hyogo (JP)

(73) Assignees: Panasonic Liquid Crystal Display Co., Ltd., Hyogo (JP); Pasona Knowledge Partner, Inc., Osaka (JP)

( * ) Notice: Subject to any disclaimer, the term of this patent is extended or adjusted under 35 U.S.C. 154(b) by 0 days.

(21) Appl. No.: 16/413,136

(22) Filed: May 15, 2019

(65) Prior Publication Data

US 2019/0265560 A1    Aug. 29, 2019

Related U.S. Application Data

(63) Continuation of application No. PCT/JP2017/011639, filed on Mar. 23, 2017.

(30) Foreign Application Priority Data

Nov. 17, 2016  (JP) ................................. 2016-224410
Nov. 17, 2016  (JP) ................................. 2016-224411

(51) Int. Cl.
*G02F 1/1343* (2006.01)
*G02F 1/1362* (2006.01)
(Continued)

(52) U.S. Cl.
CPC ...... *G02F 1/134336* (2013.01); *G02F 1/1343* (2013.01); *G02F 1/136286* (2013.01);
(Continued)

(58) Field of Classification Search
CPC ............ G02F 1/134336; G02F 1/1343; G02F 1/136286; G02F 1/1368; G02F 1/13471;
(Continued)

(56) References Cited

U.S. PATENT DOCUMENTS

2008/0291368 A1* 11/2008 Park .................... G02F 1/13471
349/74
2011/0013033 A1*  1/2011 Mori ...................... H04N 5/378
348/220.1
(Continued)

FOREIGN PATENT DOCUMENTS

JP    2003-162236    6/2003
JP    2005-128167    5/2005
(Continued)

OTHER PUBLICATIONS

International Search Report issued in International Application No. PCT/JP2017/011639, dated Jun. 20, 2017, 12 pages.

*Primary Examiner* — Syed I Gheyas
(74) *Attorney, Agent, or Firm* — Hamre, Schumann, Mueller & Larson, P.C.

(57) ABSTRACT

A display device comprises: a display panel in which a plurality of pixels are arranged in a matrix form, wherein the plurality of pixels include a plurality of first pixels and a plurality of second pixels arrayed at a pitch different from an array pitch of the plurality of first pixels, and a number of the plurality of first pixels is different from a number of the plurality of second pixels.

13 Claims, 17 Drawing Sheets

(51) Int. Cl.
  *G09F 9/302* (2006.01)
  *G09F 9/46* (2006.01)
  *G02F 1/1368* (2006.01)
  *G09G 3/36* (2006.01)

(52) U.S. Cl.
  CPC ............... *G09F 9/302* (2013.01); *G09F 9/46* (2013.01); *G02F 1/1368* (2013.01); *G09G 3/3677* (2013.01); *G09G 3/3688* (2013.01); *G09G 2300/023* (2013.01); *G09G 2300/0452* (2013.01); *G09G 2310/08* (2013.01)

(58) Field of Classification Search
  CPC ......... G09F 9/302; G09F 9/46; G09G 3/3677; G09G 3/3688; G09G 2300/023; G09G 2300/0452; G09G 2310/08; G09G 3/3648; G09G 2300/0426
  See application file for complete search history.

(56) References Cited

U.S. PATENT DOCUMENTS

| | | | |
|---|---|---|---|
| 2012/0293531 A1* | 11/2012 | Wang | ............ G09G 3/2003 345/589 |
| 2014/0111719 A1 | 4/2014 | Sekine | |
| 2014/0218956 A1 | 8/2014 | Wu | |
| 2015/0311264 A1* | 10/2015 | Shen | ............ H01L 27/3218 257/40 |

FOREIGN PATENT DOCUMENTS

| | | |
|---|---|---|
| JP | 2005-182005 | 7/2005 |
| JP | 2009-103864 | 5/2009 |
| JP | 2014-085389 | 5/2014 |

\* cited by examiner

FIG.9

|   | L | M | N | $\theta$ [deg] |
|---|---|---|---|---|
| 1 | 5 | 4 | 3 | 36.87 |
| 2 | 13 | 12 | 5 | 22.62 |
| 3 | 17 | 15 | 8 | 28.07 |
| 4 | 25 | 24 | 7 | 16.26 |
| 5 | 29 | 21 | 20 | 43.60 |
| 6 | 37 | 35 | 12 | 18.92 |
| 7 | 41 | 40 | 9 | 12.68 |
| 8 | 53 | 45 | 28 | 31.89 |
| 9 | 61 | 60 | 11 | 10.39 |
| 10 | 65 | 63 | 16 | 14.25 |
| 11 | 65 | 56 | 33 | 30.51 |

DISPLAY DEVICE

CROSS-REFERENCE TO RELATED APPLICATION

This application is a bypass continuation of international patent application PCT/JP2017/011639, filed on Mar. 23, 2017 designating the United States of America. Priority is claimed based on Japanese patent application JP 2016-224410, filed on Nov. 17, 2016 and Japanese patent application JP 2016-224411, filed on Nov. 17, 2016. The entire disclosures of these international and Japanese patent applications are incorporated herein by reference in their entirety.

TECHNICAL FIELD

The present invention relates to a display device.

BACKGROUND ART

Conventionally, in a liquid crystal display device, there has been proposed a technique of inclining (rotating) an array direction of pixels with respect to a predetermined axis (for example, an axis parallel to an edge side of a substrate constituting the liquid crystal display device). For example, Unexamined Japanese Patent Publication No. 2009-103864P discloses a technique of preventing generation of what is called disclination by inclining the array direction of pixels by a predetermined angle. Unexamined Japanese Patent Publication No. 2005-128167 discloses a technique of preventing the generation of what is called moire by inclining the array direction of the pixels in one of display panels by a predetermined angle in a liquid crystal display device in which an observer perceives a three-dimensional image (3D image) by overlapping a plurality of display panels to change a luminance ratio of the images displayed on the respective display panels.

SUMMARY

However, the above patent literatures do not disclose a specific method of inclining the array direction of the pixels in work of designing the arrangement of the pixels, and work efficiency is not considered.

The present invention has been made in view of the above-mentioned circumstances, and an object of the present invention is to improve the work efficiency in inclining the array direction of the pixels in the display device having an inclination angle in the array direction of the pixels.

To solve the above problem, a display device according to a present disclosure comprises: a display panel in which a plurality of pixels are arranged in a matrix form, wherein the plurality of pixels include a plurality of first pixels and a plurality of second pixels arrayed at a pitch different from an array pitch of the plurality of first pixels, and a number of the plurality of first pixels is different from a number of the plurality of second pixels.

In a display device according to a present disclosure, the plurality of pixels are arranged in the matrix form in a first direction and a second direction, the plurality of first pixels and the plurality of second pixels are equal to each other in the array pitch in the first direction, and the plurality of first pixels and the plurality of second pixels are different from each other in the array pitch in the second direction.

In a display device according to a present disclosure, a first pixel group constructed with a plurality of the first pixels arrayed adjacent to each other and a second pixel group constructed with a plurality of the second pixels arrayed adjacent to each other are alternately arrayed.

In a display device according to a present disclosure, the number of the plurality of first pixels included in the first pixel group and the number of the plurality of second pixels included in the second pixel group are different from each other.

In a display device according to a present disclosure, the plurality of pixels further include a plurality of third pixels and a plurality of fourth pixels, the plurality of first pixels and the plurality of third pixels are equal to each other in the array pitch in the second direction, the plurality of first pixels and the plurality of third pixels are different from each other in the array pitch in the first direction, the plurality of second pixels and the plurality of fourth pixels are equal to each other in the array pitch in the second direction, the plurality of second pixels and the plurality of fourth pixels are different from each other in the array pitch in the first direction, the plurality of third pixels and the plurality of fourth pixels are equal to each other in the array pitch in the first direction, and the plurality of third pixels and the plurality of fourth pixels are different from each other in the array pitch in the second direction.

In a display device according to a present disclosure, the number of the plurality of second pixels and the number of the plurality of third pixels are different from each other, and the number of the plurality of third pixels and the number of the plurality of fourth pixels are different from each other.

In a display device according to a present disclosure the display panel includes a substrate, and the first direction and the second direction are inclined with respect to an end side of the substrate.

To solve the above problem, a display device according to a present disclosure comprises: a first display panel and a second display panel that are arranged to overlap each other in planar view, wherein in the first display panel, a plurality of pixels are arranged in a matrix form in a first direction and a second direction, in the second display panel, a plurality of pixels are arranged in a matrix form in a third direction and a fourth direction, the plurality of pixels arranged in the first display panel includes a plurality of first pixels and a plurality of second pixels, the plurality of first pixels and the plurality of second pixels are equal to each other in an array pitch in the first direction, the plurality of first pixels and the plurality of second pixels are different from each other in an array pitch in the second direction, in the plurality of pixels arranged in the second display panel, the array pitches in the third direction are equal to each other, and the array pitches in the fourth direction are equal to each other, and the array pitch in the fourth direction of the plurality of pixels arranged in the second display panel is larger than one of the array pitch in the second direction of the plurality of first pixels and the array pitch in the second direction of the plurality of second pixels, and is smaller than the other of the array pitch in the second direction of the plurality of first pixels and the array pitch in the second direction of the plurality of second pixels.

In a display device according to a present disclosure, the second direction is inclined by 28 degrees to 32 degrees with respect to the fourth direction.

To solve the above problem, a display device according to a present disclosure comprises: a display panel in which a plurality of rectangular pixels each of which includes a pair of sides extending in a first direction and a pair of sides extending in a second direction are arranged in a matrix form in the first direction and the second direction, wherein the plurality of pixels include a first pixel, a second pixel, and a third pixel, and assuming that θ is an angle formed between a first side and a third side when a right triangle constructed with the first side that connects a first end of the first pixel and the second end of the second pixel and extends in the first direction, a second side that connects the second end and a third end of the third pixel and extends in the second direction, and the third side that connects the first end and the third end and is parallel to an end side of a substrate constituting the display panel is formed with the first end, the second end, and the third end as vertices, tan θ and cos θ are rational numbers.

In a display device according to a present disclosure, the display panel includes a plurality of data lines and a plurality of gate lines, and the plurality of data lines or the plurality of gate lines are inclined by the angle θ with respect to the end side of the substrate.

In a display device according to a present disclosure, the display panel includes a plurality of gate lines extending in the first direction and a plurality of data lines extending in the second direction, and a length of the first side is an integral multiple of an array pitch of the plurality of data lines, and a length of the second side is an integral multiple of an array pitch of the plurality of gate lines.

To solve the above problem, a display device according to a present disclosure comprises: a first display panel and a second display panel that are arranged to overlap each other in planar view, wherein in the first display panel, a plurality of rectangular pixels each of which is constructed with a pair of sides extending in a first direction and a pair of sides extending in a second direction are arranged in a matrix form in the first direction and the second direction, the plurality of pixels include a first pixel, a second pixel, and a third pixel, when a right triangle constructed with the first side that connects a first end of the first pixel and a second end of the second pixel and extends in the first direction, a second side that connects the second end and a third end of the third pixel and extends in the second direction, and the third side that connects the first end and the third end is formed with the first end, the second end, and the third end as vertices, the third end is parallel to the plurality of data lines or the plurality of gate lines of the second panel, and assuming that θ is an angle formed between a first side and a third side, tan θ and cos θ are rational numbers.

To solve the above problem, a display device according to a present disclosure comprises: a first display panel and a second display panel that overlap each other in planar view, wherein in the first display panel, a plurality of rectangular pixels each of which includes a pair of sides extending in a first direction and a pair of sides extending in a second direction are arranged in a matrix form in the first direction and the second direction, the plurality of pixels include a first pixel, a second pixel, and a third pixel, and assuming that θ is an angle formed between a first side and a third side when a right triangle constructed with the first side that connects a first end of the first pixel and the second end of the second pixel and extends in the first direction, a second side that connects the second end and a third end of the third pixel and extends in the second direction, and the third side that connects the first end and the third end and is parallel to an end side of a substrate constituting the first display panel is formed with the first end, the second end, and the third end as vertices, tan θ and cos θ are rational numbers.

In a display device according to a present disclosure, the tan θ satisfies any one of $3/4$, $5/12$, $8/15$, $7/24$, $20/21$, $12/35$, $9/40$, $28/45$, $11/60$, $16/63$, and $33/56$.

In a display device according to a present disclosure, the tan θ satisfies any one of $3/4$, $5/12$, $8/15$, $7/24$, and $20/21$.

In a display device according to a present disclosure, the tan θ satisfies $8/15$.

In a display device according to a present disclosure, an end side of a substrate constituting the first display panel is inclined with respect to an end side of a substrate constituting the second display panel.

In a display device according to a present disclosure, an angle formed between an end side of a substrate constituting the first display panel and an end side of a substrate constituting the second display panel ranges from 1 degree to 3 degrees inclusive.

In a display device according to a present disclosure, an angle formed between a gate line formed in the first display panel and a gate line formed in the second display panel is approximately 30 degrees in planar view.

In a display device according to a present disclosure, in the second display panel, a plurality of rectangular pixels each of which includes a pair of sides extending in a third direction and a pair of sides extending in a fourth direction are arranged in a matrix form in the third direction and the fourth direction, the plurality of pixels in the second display panel includes a fourth pixel, a fifth pixel, and a sixth pixel, and assuming that α is an angle formed between a fourth side and the sixth side when a right triangle constructed with the fourth side that connects a fourth end of the fourth pixel and a fifth end of the fifth pixel and extends in the third direction, a fifth side that connects the fifth end and a sixth end of the sixth pixel and extends in the fourth direction, and a sixth side that connects the fourth end and the sixth end and is parallel to an end side of a substrate constituting the second display panel is formed with the fourth end, the fifth end, and the sixth end as vertices, tan α and cos α are rational numbers.

In a display device according to a present disclosure, the tan α satisfies any one of $3/4$, $5/12$, $8/15$, $7/24$, $20/21$, $12/35$, $9/40$, $28/45$, $11/60$, $16/63$, and $33/56$.

In a display device according to a present disclosure, each of the tan θ and the tan α satisfies $7/24$.

The display device according to the present disclosure can improve the work efficiency in inclining the array direction of the pixels in the display device having an inclination angle in the array direction of the pixels.

BRIEF DESCRIPTION OF DRAWINGS

FIG. 9 is a table representing a relationship between a length of a first side, a length of a second side and a third side in a right triangle drawn with the three pixels in first display panel.

DESCRIPTION OF EMBODIMENT

Hereinafter, an exemplary embodiment of the present invention will be described with reference to the drawings. In the following embodiment, a liquid crystal display device is described as an example. However, the display device according to the present invention is not limited to the liquid crystal display device, but may be, for example, an organic EL display device.

The liquid crystal display device of the exemplary embodiment includes a display panel that displays an image, a drive circuit (a source driver and a gate driver) that drives the display panel, a timing controller that controls the drive circuit, an image processor that performs image processing on an input video signal input from an outside and outputs image data to the timing controller, and a backlight that irradiates the display panel with light from a back surface side. There is no limitation to the number of display panels, but one or a plurality of display panels may be used. For a plurality of display panels, when viewed from an observer side, the plurality of display panels are disposed while overlapping each other in a front-back direction, and an image is displayed on each display panel. Liquid crystal display device 10 including two display panels will be described below by way of example.

Figure 1:
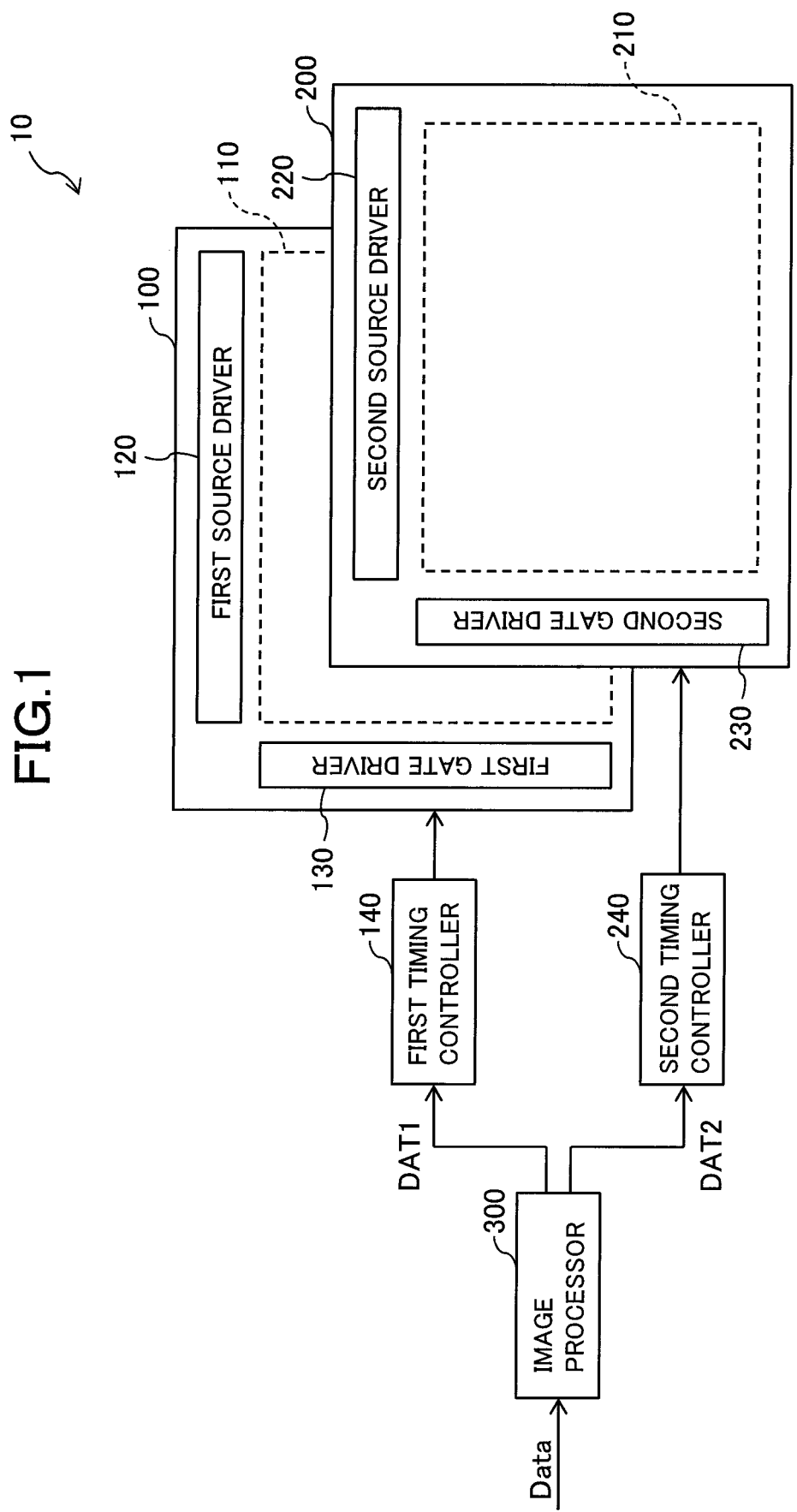
FIG. 1 is a plan view illustrating a schematic configuration of liquid crystal display device according to an exemplary embodiment.

FIG. 1 is a plan view illustrating a schematic configuration of liquid crystal display device 10 of the exemplary embodiment. As illustrated in FIG. 1, liquid crystal display device 10 includes first display panel 100 disposed farther away from an observer (rear side), second display panel 200 disposed closer to the observer (front side) with respect to first display panel 100, first source drivers 120 and first gate drivers 130 that are provided in first display panel 100, first timing controller 140 that controls first source drivers 120 and first gate drivers 130, second source drivers 220 and second gate drivers 230 that are provided in second display panel 200, second timing controller 240 that controls second source drivers 220 and second gate drivers 230, and image processor 300 that outputs image data to first timing controller 140 and second timing controller 240. Image processor 300 receives input video signal Data transmitted from an external system (not illustrated), performs known image processing on input video signal Data, outputs first image data DAT1 to first timing controller 140, and outputs second image data DAT2 to second timing controller 240. Image processor 300 also outputs a control signal (not illustrated in FIG. 1) such as a synchronizing signal to first timing controller 140 and second timing controller 240. First image data DAT1 is image data for displaying a monochrome image, and second image data DAT2 is image data for displaying a color image. First display panel 100 displays the monochrome image in first image display region 110 according to input video signal Data, and second display panel 200 displays the color image in second image display region 210 according to input video signal Data. The backlight (not illustrated in FIG. 1) is disposed on a back surface side of first display panel 100.

Figure 2:
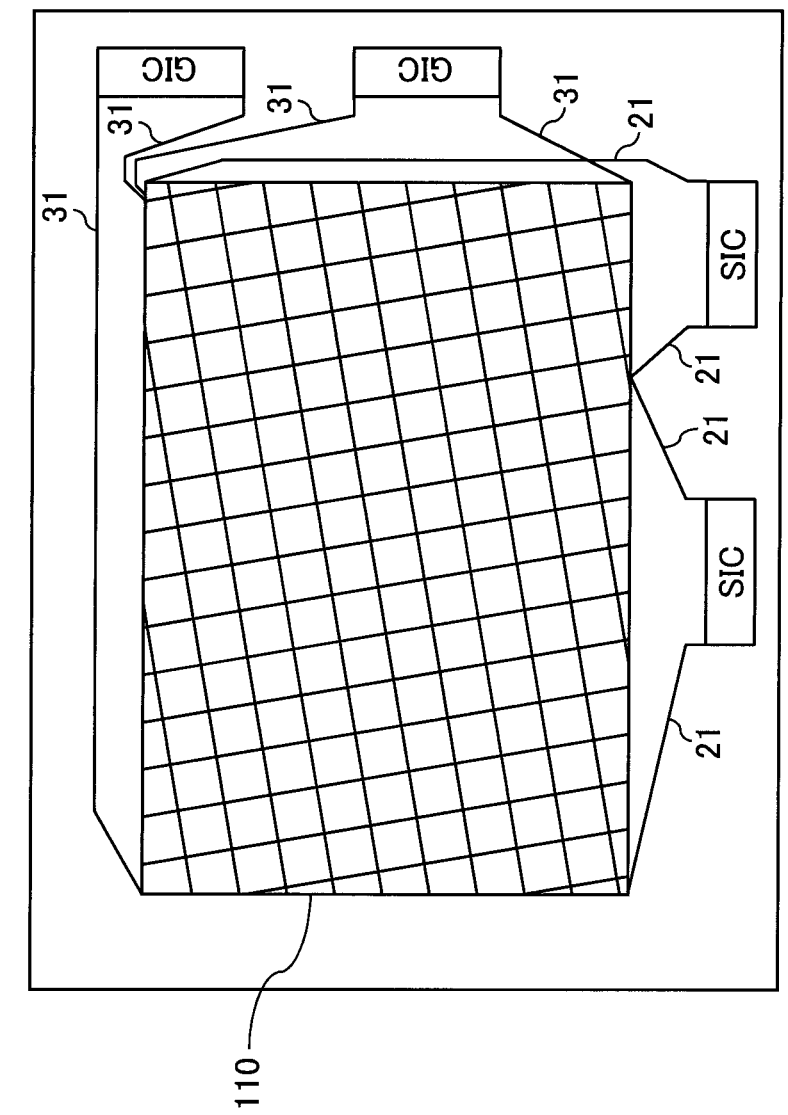
FIG. 2 is a plan view illustrating a schematic configuration of first display panel according to the exemplary embodiment.
Figure 3:
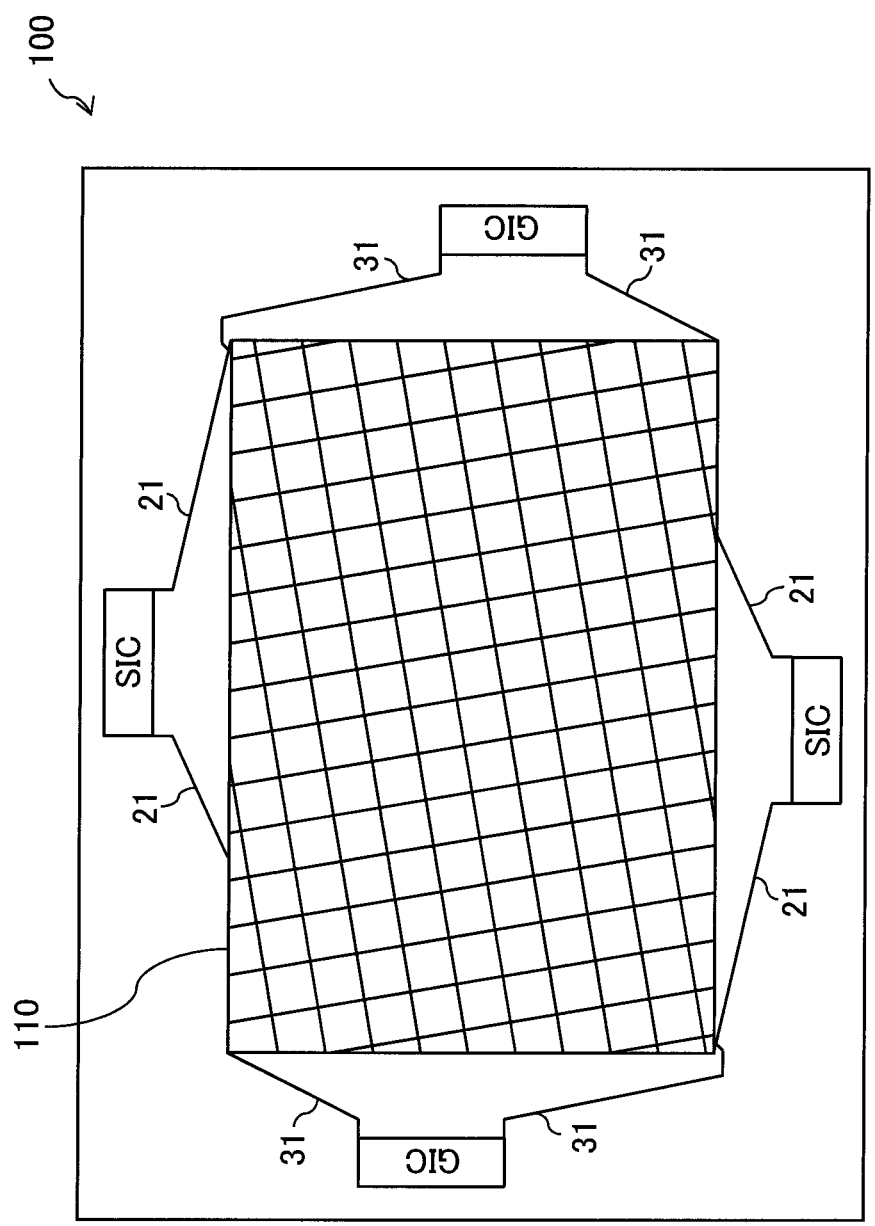
FIG. 3 is a plan view illustrating another schematic configuration of first display panel according to the exemplary embodiment.

FIGS. 2 and 3 are plan views illustrating a schematic configuration of first display panel 100. As illustrated in FIGS. 2 and 3, in first display panel 100, a plurality of pixels are obliquely arranged, for example, with respect to an edge side of the substrate. In the example of FIG. 2, two source driver ICs (SICs) constituting first source driver 120 are disposed along one side (lower side in FIG. 2) of first image display region 110, and two gate driver ICs (GICs) constituting first gate driver 130 are disposed along one side (right side in FIG. 2) of first image display region 110. In the configuration of FIG. 2, gate lead line 31 is disposed on the side (upper side in FIG. 2) opposed to the side on which the source driver ICs (SICs) are disposed. In the example of FIG. 3, the two source driver ICs (SICs) constituting first source driver 120 are respectively disposed along two sides (the upper side and the lower side in FIG. 3) of first image display region 110, and the two gate driver ICs (GICs) constituting first gate driver 130 are respectively disposed along two sides (the right side and the left side in FIG. 3) of first image display region 110. In the configuration of FIG. 3, the source lead lines 21 are disposed on two sides (the upper and the lower sides in FIG. 3) of first image display region 110, and gate lead lines 31 are disposed on two sides (the right side and the left side in FIG. 3) of first image display region 110.

Figure 4:
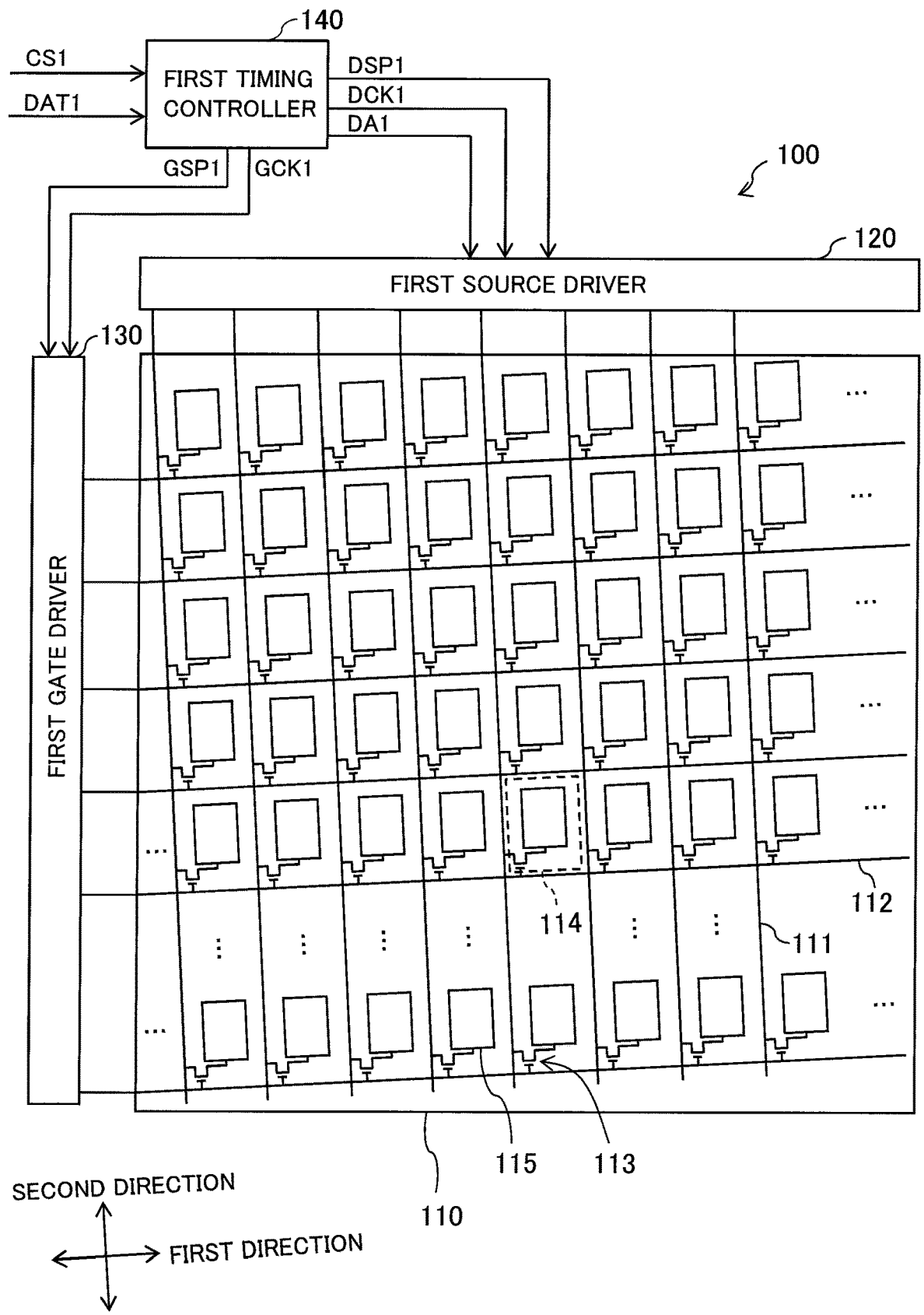
FIG. 4 is a plan view illustrating a schematic configuration of first display panel according to the exemplary embodiment.
Figure 5:
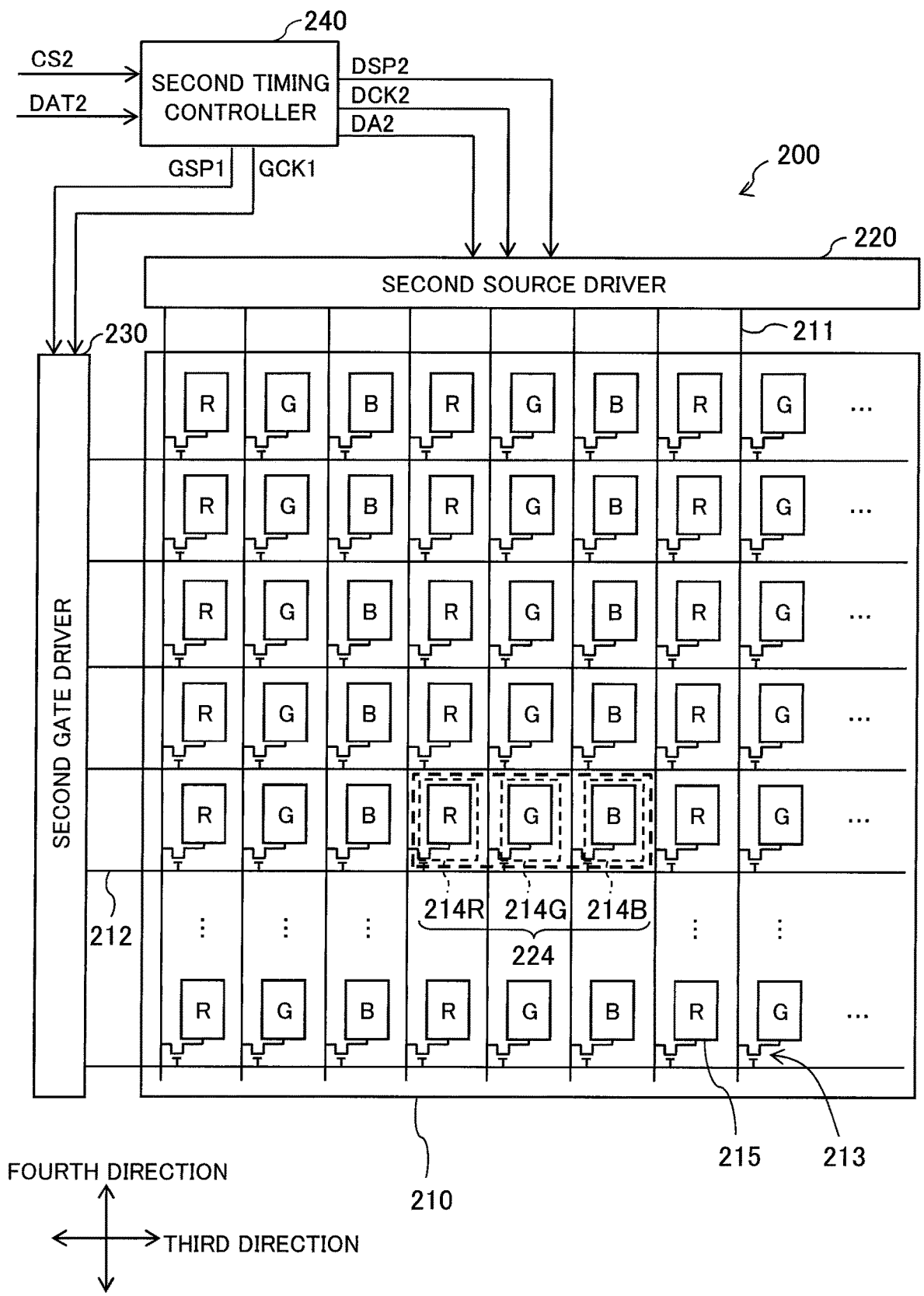
FIG. 5 is a plan view illustrating a schematic configuration of second display panel according to the exemplary embodiment.
Figure 6:
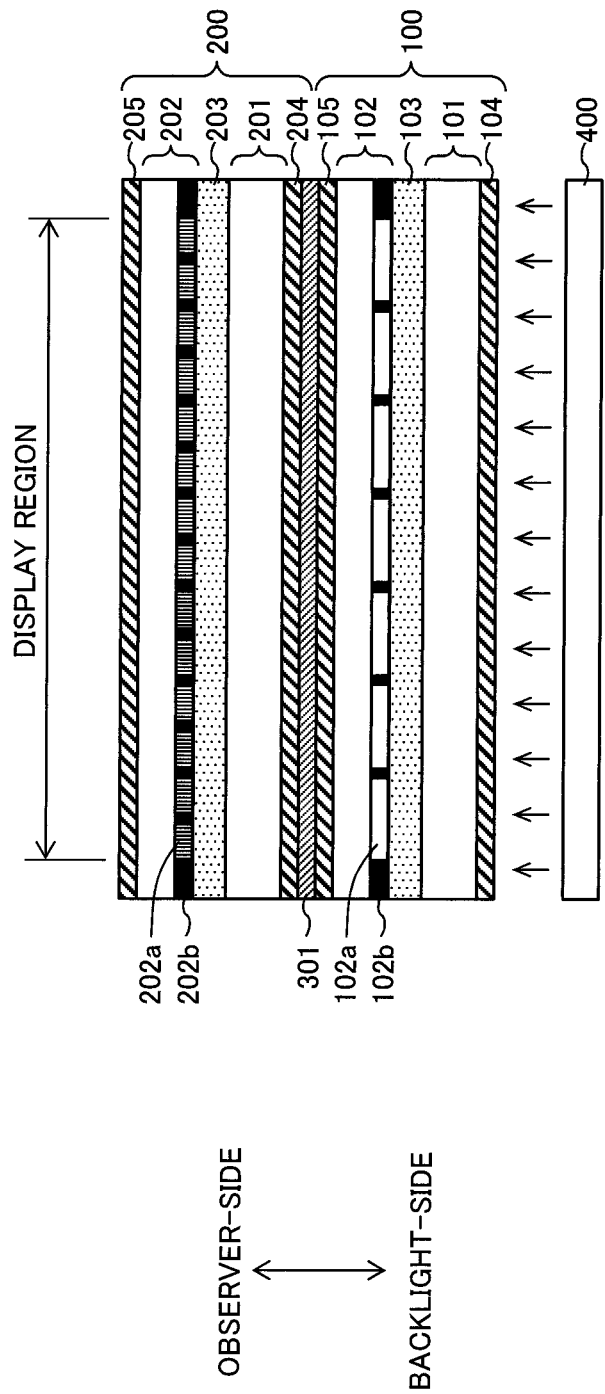
FIG. 6 is a sectional view illustrating first display panel and second display panel according to the exemplary embodiment.

FIG. 4 is a plan view illustrating a schematic configuration of first display panel 100, and FIG. 5 is a plan view illustrating a schematic configuration of second display panel 200. FIG. 6 is a sectional view illustrating first display panel 100 and second display panel 200. In FIG. 4, as illustrated in FIGS. 2 and 3, the plurality of pixels are obliquely arranged with respect to the edge side of the substrate. In FIGS. 4 and 5, for convenience, pixels 114 of first display panel 100 and pixel 214 (subpixel) of second display panel 200 are illustrated with the same size. However, in liquid crystal display device 10 of the exemplary embodiment, as described later (see FIG. 7), an area of pixel 114 of first display panel 100 is equal to an area of pixel 224 (including a red subpixel, a green subpixel, and a blue subpixel) of second display panel 200.

The configuration of first display panel 100 will be described with reference to FIGS. 4 and 6. As illustrated in FIG. 6, first display panel 100 includes thin film transistor substrate 101 (hereinafter, referred to as a TFT substrate) disposed on the side of backlight 400, color filter substrate 102 (hereinafter, referred to as a CF substrate), which is disposed on the observer side while being opposite to TFT substrate 101, and liquid crystal layer 103 disposed between TFT substrate 101 and CF substrate 102. Polarizing plate 104 is disposed on the side of backlight 400 of first display panel 100, and polarizing plate 105 is disposed on the observer side.

In TFT substrate 101, as illustrated in FIG. 4, a plurality of gate lines 112 extending in a first direction and a plurality of data lines 111 extending in a second direction different from the first direction are formed, and thin film transistor 113 (hereinafter, referred to as a TFT) is formed near an intersection between each of the plurality of data lines 111 and each of the plurality of gate lines 112. In planar view of first display panel 100, a region surrounded by two data lines 111 adjacent to each other and two gate lines 112 adjacent to each other is defined as one pixel 114, and a plurality of pixels 114 are disposed in a matrix form. The plurality of data lines 111 are disposed at equal intervals in the first direction, and the plurality of gate lines 112 are disposed at equal intervals in the second direction. In TFT substrate 101, pixel electrode 115 is formed in each pixel 114, and one common electrode (not illustrated) common to the plurality of pixels 114 is formed. A drain electrode constituting TFT 113 is electrically connected to data line 111, a source electrode is electrically connected to pixel electrode 115, and a gate electrode is electrically connected to gate line 112.

As illustrated in FIG. 6, in CF substrate 102, black matrix 102b blocking light transmission is formed at a position corresponding to a boundary of each pixel 114. The colored portion is not formed in region 102a surrounded by black matrix 102b. For example, an overcoat film is formed in region 102a.

Although the in-plane switching (IPS) type pixel structure is cited as an example of first display panel 100, first display panel 100 is not limited to the IPS type pixel structure. A layered structure of each unit constituting pixel 114 is not limited to the above-described configuration.

Based on first image data DAT1 and first control signal CS1 (such as a clock signal, a vertical synchronizing signal, and a horizontal synchronizing signal), which are output from image processor 300, first timing controller 140 generates first image DA1 and various timing signals (data start pulse DSP1, data clock DCK1, gate start pulse GSP1, and gate clock GCK1) in order to control drive of first source driver 120 and first gate driver 130 (see FIG. 4). First timing controller 140 outputs first image data DA1, data start pulse DSP1, and data clock DCK1 to first source driver 120, and outputs gate start pulse GSP1 and gate clock GCK1 to first gate driver 130.

First source driver 120 outputs a data signal (data voltage) corresponding to first image data DA1 to data lines 111 based on data start pulse DSP1 and data clock DCK1. First gate driver 130 outputs a gate signal (gate voltage) to gate lines 112 based on gate start pulse GSP1 and gate clock GCK1.

The data voltage is supplied from first source driver 120 to each data line 111, and the gate voltage is supplied from first gate driver 130 to each gate line 112. Common voltage Vcom is supplied from a common driver (not illustrated) to the common electrode. When the gate voltage (gate-on voltage) is supplied to gate line 112, TFT 113 connected to gate line 112 is turned on, and the data voltage is supplied to pixel electrode 115 through data line 111 connected to TFT 113. An electric field is generated by a difference between the data voltage supplied to pixel electrode 115 and common voltage Vcom supplied to the common electrode. The liquid crystal is driven by the electric field to control the transmittance of light from backlight 400, thereby displaying the image. The monochrome image is displayed on first display panel 100.

The configuration of second display panel 200 will be described below with reference to FIGS. 5 and 6. As illustrated in FIG. 6, second display panel 200 includes TFT substrate 201 disposed on the side of backlight 400, CF substrate 202 that is disposed on the observer side while opposed to TFT substrate 201, and liquid crystal layer 203 disposed between TFT substrate 201 and CF substrate 202. Polarizing plate 204 is disposed on the side of backlight 400 of second display panel 200, and polarizing plate 205 is disposed on the observer side. Adhesion sheet 301 is disposed between polarizing plate 105 of first display panel 100 and polarizing plate 204 of second display panel 200.

In TFT substrate 201, as illustrated in FIG. 5, a plurality of gate lines 212 extending in a third direction and a plurality of data lines 211 extending in a fourth direction different from the third direction are formed, and TFT 213 is formed near an intersection between each of the plurality of data lines 211 and each of the plurality of gate lines 212. In planar view of second display panel 200, a region surrounded by two data lines 211 adjacent to each other and two gate lines 212 adjacent to each other is defined as one subpixel 214, and a plurality of subpixels 214 are disposed in a matrix form. The plurality of data lines 211 are disposed at equal intervals in the third direction, and the plurality of gate lines 212 are disposed at equal intervals in the fourth direction. In TFT substrate 201, pixel electrode 215 is formed in each subpixel 214, and one common electrode (not illustrated) common to the plurality of subpixels 214 is formed. A drain electrode constituting TFT 213 is electrically connected to data line 211, a source electrode is electrically connected to pixel electrode 215, and a gate electrode is electrically connected to gate line 212.

As illustrated in FIG. 6, a plurality of colored portions 202a each of which corresponds to subpixel 214 are formed on CF substrate 202. Each colored portion 202a is surrounded by black matrix 202b blocking light transmission. For example, each colored portion 202a is formed into a rectangular shape. The plurality of colored portions 202a include red portions made of a red (R color) material to transmit red light, green portions made of a green (G color) material to transmit green light, and blue portions made of a blue (B color) material to transmit blue light. The red portion, the green portion, and the blue portion are repeatedly arranged in this order in the third direction, the colored portions having the same color are arranged in the fourth direction, and black matrix 202b is formed at a boundary between adjacent colored portions 202a. As illustrated in FIG. 5, the plurality of subpixels 214 include red subpixel 214R corresponding to the red portion, green subpixel 214G corresponding to the green portion, and blue subpixel 214B corresponding to the blue portion. One red subpixel 214R, one green subpixel 214G, and one blue subpixel 214B constitute one pixel 224.

Figure 7A:
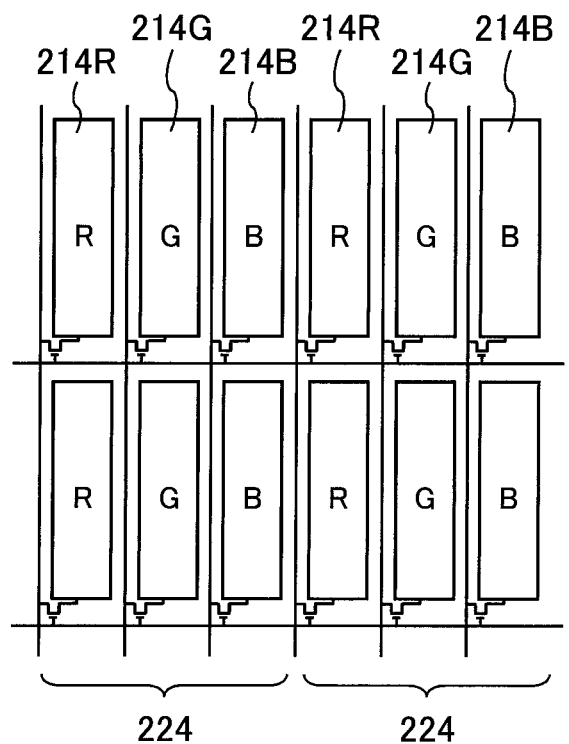
FIG. 7A is a plan view illustrating an arrangement of pixels in second display panel according to the exemplary embodiment.
Figure 7B:
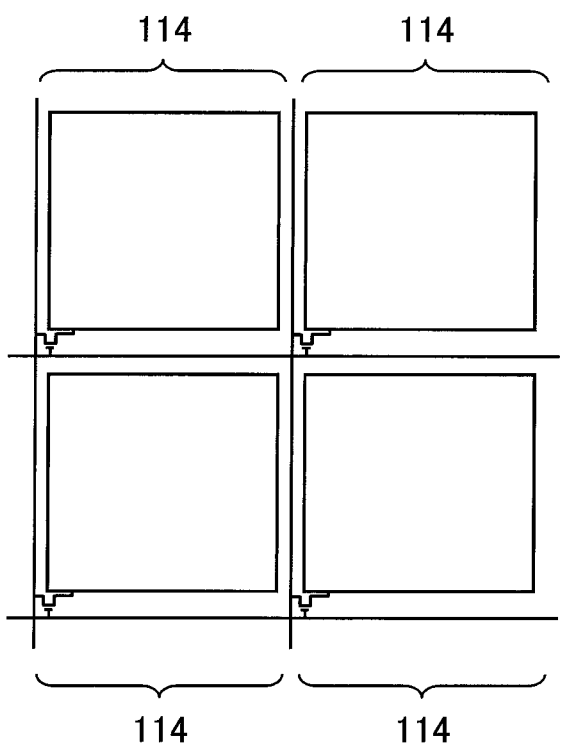
FIG. 7B is a plan view illustrating an arrangement of pixels in first display panel according to the exemplary embodiment.

Each pixel 114 of first display panel 100 and each pixel 224 of second display panel 200 are equal to each other in an area. For example, as illustrated in FIGS. 7(a) and 7(b), the area of one pixel 114 (see FIG. 7(b)) of first display panel 100 is equal to the area of one pixel 224 (see FIG. 7(a)) constructed with one red subpixel 214R, one green subpixel 214G, and one blue subpixel 214B of second display panel 200.

Although the in-plane switching (IPS) type pixel structure is cited as an example of second display panel 200, second display panel 200 is not limited to the IPS type pixel structure. A layered structure of each unit constituting subpixel 214 is not limited to the above configuration.

Based on second image data DAT2 and second control signal CS2 (such as a clock signal, a vertical synchronizing signal, and a horizontal synchronizing signal) that are output from image processor 300, second timing controller 240 generates second image data DA2 and various timing signals (data start pulse DSP2, data clock DCK2, gate start pulse GSP2, and gate clock GCK2) in order to control drive of second source driver 220 and second gate driver 230 (see FIG. 5). Second timing controller 240 outputs second image data DA2, data start pulse DSP2, and data clock DCK2 to second source driver 220, and outputs gate start pulse GSP2 and gate clock GCK2 to second gate driver 230.

Second source driver 220 outputs the data voltage corresponding to second image data DA2 to data lines 211 based on data start pulse DSP2 and data clock DCK2. Second gate driver 230 outputs the gate voltage to gate lines 212 based on gate start pulse GSP2 and gate clock GCK2.

The data voltage is supplied from second source driver 220 to each data line 211, and the gate voltage is supplied from second gate driver 230 to each gate line 212. Common voltage Vcom is supplied from the common driver to the common electrode. When the gate voltage (gate-on voltage) is supplied to gate line 212, TFT 213 connected to gate line 212 is turned on, and the data voltage is supplied to pixel electrode 215 through data line 211 connected to TFT 213. The electric field is generated by a difference between the data voltage supplied to pixel electrode 215 and common voltage Vcom supplied to the common electrode. The liquid crystal is driven by the electric field to control the transmittance of light from backlight 400, thereby displaying the image. In second display panel 200, the color image is displayed by supply of a desired data voltage to data line 211 connected to pixel electrode 215 of each of red subpixel 214R, green subpixel 214G, and blue subpixel 214B.

In the liquid crystal display device configured by overlapping the plurality of display panels, desirably the array direction of the pixels in one of the display panels is inclined by a predetermined angle in order to prevent the generation of the moire. However, there is a design limitation in the case of providing an inclination angle to the array direction of the pixels. For example, in CAD, it is necessary to design the array of the pixels according to what is called a grid that is a rectangular pattern of dots or lines displayed throughout a drawing region and is a minimum unit of data processing. For example, the grids are set at 0.05-um intervals. Specifically, the array of the pixels needs to be designed such that an end of the pixel (the intersection of the data line and the gate line) is placed on the grid. For this reason, in designing an array pattern of the pixels having the inclination angle in the array direction, there is a possibility that a work time is increased to degrade the work efficiency.

Figure 8:
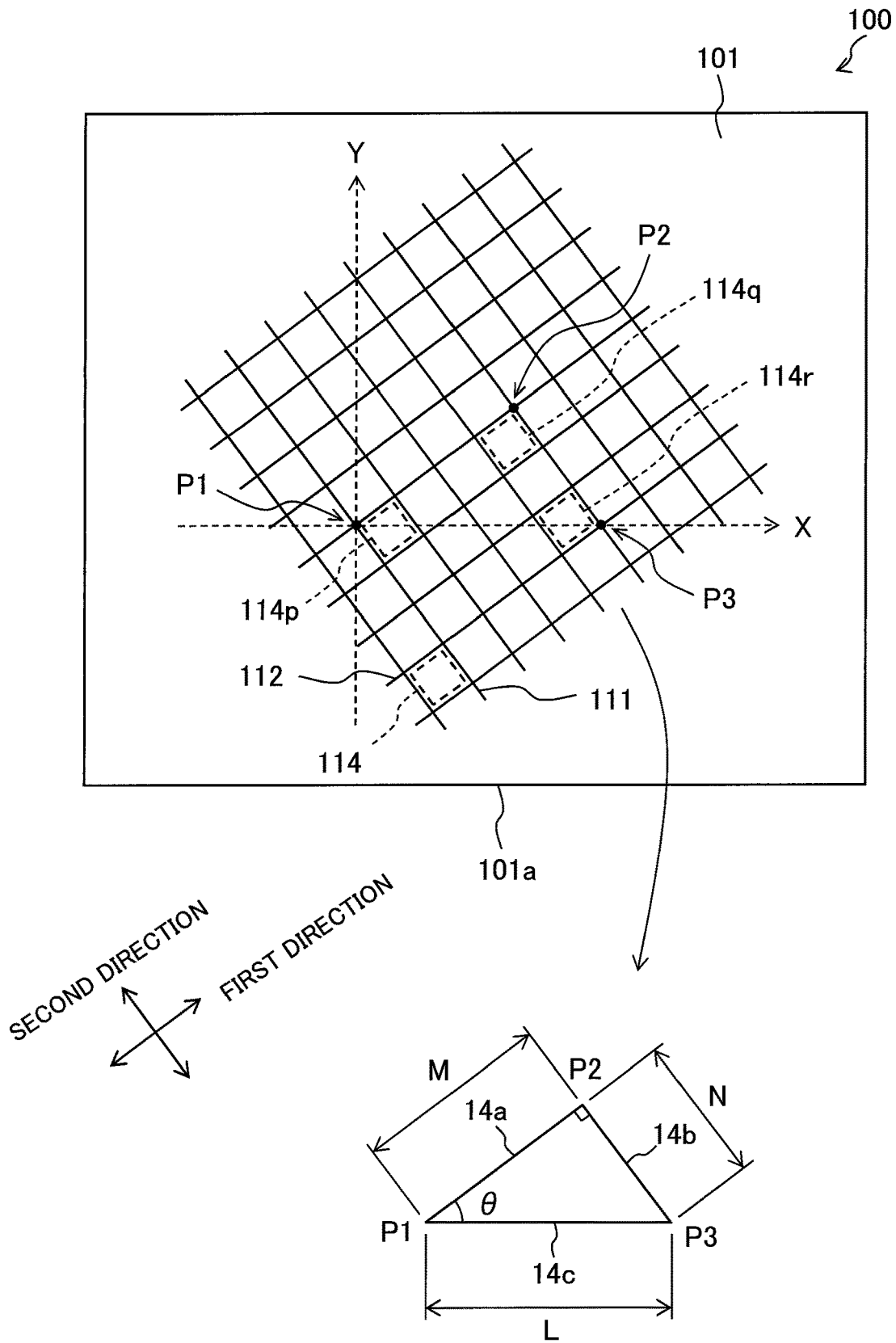
FIG. 8 is a plan view illustrating the characteristic configuration in liquid crystal display device according to the exemplary embodiment.

In this respect, liquid crystal display device 10 of the exemplary embodiment has a characteristic configuration capable of improving the work efficiency in inclining the array direction of the pixels. The characteristic configuration in liquid crystal display device 10 will be described below. FIG. 8 is a plan view illustrating the characteristic configuration in liquid crystal display device 10. In liquid crystal display device 10, the array direction of the pixels is inclined by an angle θ with respect to an X axis in at least one of first display panel 100 and second display panel 200. FIG. 8 illustrates a configuration example in which the array direction (first direction) of pixels 114 is inclined by the angle θ with respect to the X axis in first display panel 100. The X axis represents a horizontal axis, and a Y axis represents a vertical axis.

As illustrated in FIG. 8, in first display panel 100, attention is paid to any three pixels, for example, first pixel 114p, second pixel 114q, and third pixel 114r. In the case that the right triangle formed by first side 14a that connects first end P1 and second end P2 and extends in the first direction, second side 14b that connects second end P2 and third end P3 and extends in the second direction, and third side 14c that connects first end P1 and third end P3 and is parallel to end side 101a of the substrate (TFT substrate 101) constituting first display panel 100 with first end P1 of first pixel 114p, second end P2 of second pixel 114q, and third end P3 of third pixel 114r as apexes, assuming that θ is an angle formed between first side 14a and third side 14c, tan θ and cos θ are rational numbers. At this point, edge side 101a of TFT substrate 101 extends in an X-axis direction (horizontal direction).

More specifically, assuming that M is a length of first side 14a, that N is a length of second side 14b, and that L is a length of third side 14c, a ratio (L:M:N) has a relationship in FIG. 9. That is, in the above right triangle, tan θ satisfies one of $3/4$, $5/12$, $8/15$, $7/24$, $20/21$, $12/35$, $9/40$, $28/45$, $11/60$, $16/63$, and $33/56$. Cos θ satisfies one of $4/5$, $12/13$, $15/17$, $24/25$, $21/29$, $35/37$, $40/41$, $45/53$, $60/61$, $63/65$, and $56/65$. All length L, length M, and length N are a rational number, and length L is an integral multiple of the grid interval (in this case, 0.05 um). Length M of first side 14a is an integral multiple of the array pitch of the plurality of data lines 111, and length N of second side 14b is an integral multiple of the array pitch of the plurality of gate lines 112.

In the array of pixels 114 satisfying the above conditions, the inclination angle with respect to the extending direction (X-axis direction) of end side 101a is set in a range of about 10 degrees to about 44 degrees. In designing the array of pixels 114, the working efficiency is improved when first end P1, second end P2 and third end P3 are not largely separated from one another. For this reason, among the conditions in FIG. 9, preferably tan θ satisfies one of $3/4$, $5/12$, $8/15$, $7/24$, and $20/21$, and cos θ satisfies one of $4/5$, $12/13$, $15/17$, $24/25$, and $21/29$.

In the above characteristic configuration, the end of pixel 114 is placed on the grid by the simple method, so that the work efficiency can be improved in inclining the array direction of pixels 114.

Figure 10:
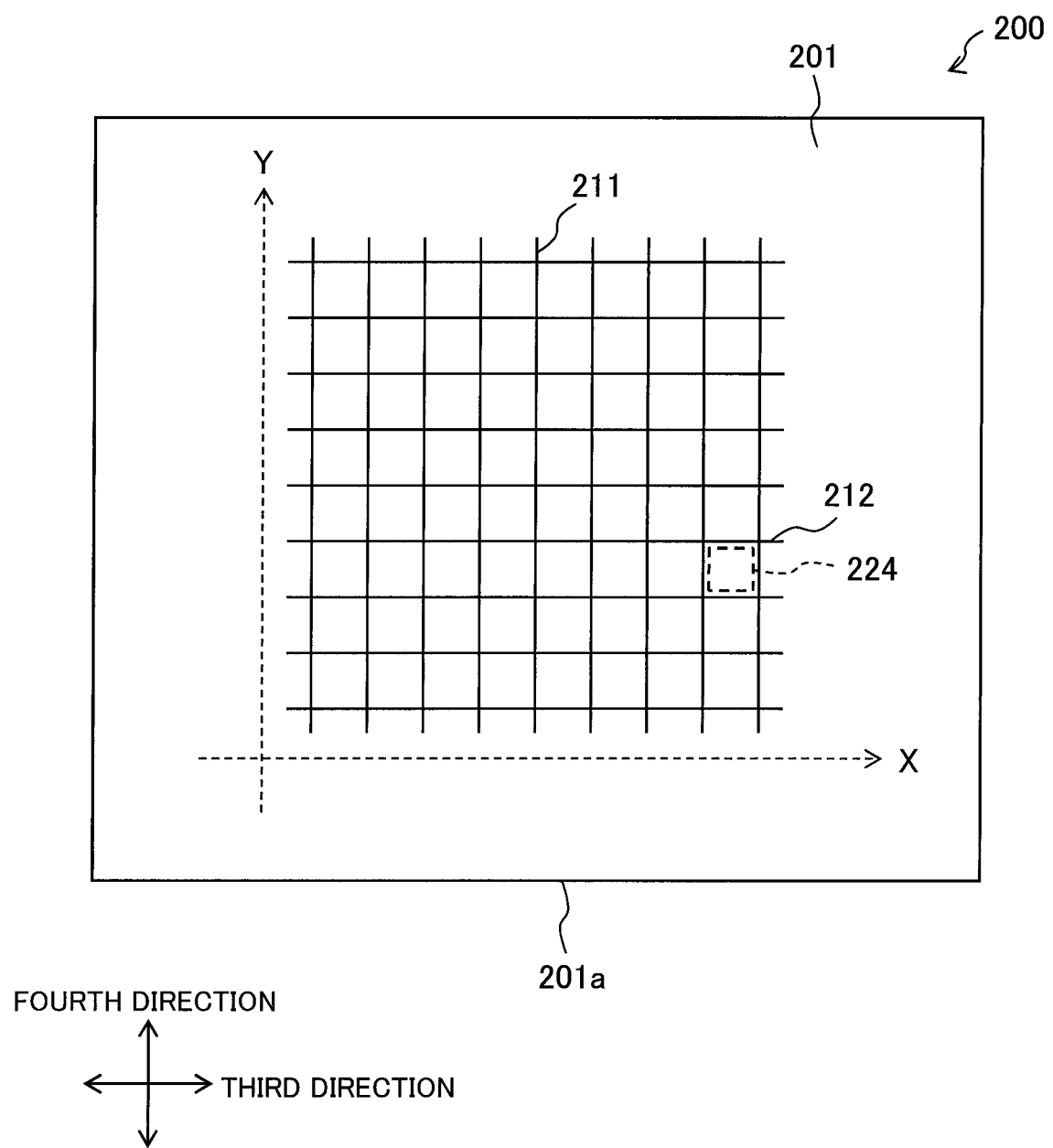
FIG. 10 is a plan view illustrating an arrangement of pixels in the second display panel.

In the above configuration, pixel 114 of first display panel 100 is inclined by the angle θ with respect to end side 101a (X-axis direction) of TFT substrate 101. The plurality of gate lines 112 are inclined by the angle θ with respect to end side 101a (X-axis direction) of TFT substrate 101. Liquid crystal display device 10 of the exemplary embodiment is not limited to the above configuration. For example, as illustrated in FIG. 10, in the case that the extending direction (third direction) of gate line 212 is matched with the X-axis direction (horizontal direction) in second display panel 200, namely, in the case that third side 14c (see FIG. 8) is parallel to gate line 212 of second display panel 200, pixel 114 of first display panel 100 is inclined by the angle θ with respect to gate line 212 (X-axis direction) of second display panel 200. In this case, tan θ and cos θ also satisfy the above conditions (see FIG. 9).

In order to enhance the effect that prevents the generation of the moire, an inclination angle θ of pixel 114 in first display panel 100 is preferably about 30 degrees (for example, 28 degrees to 32 degrees). For this reason, in the right triangle of FIG. 8, preferably tan θ satisfies $8/15$ and cos θ satisfies $15/17$ when the inclination angle θ becomes, for example, 28.07 degrees. The generation of the moire affects a relative angle difference between the array direction of pixels 114 of first display panel 100 and the array direction of the pixels 224 of the second display panel 200. For example, the relative angle difference means an angle formed between the array direction (for example, the first direction) of pixels 114 of first display panel 100 and the array direction (for example, the third direction) of pixels 224 of second display panel 200 or an angle formed between the extending direction (for example, the first direction) of gate lines 112 of first display panel 100 and the extending direction (for example, the third direction) of gate lines 212 of second display panel 200.

Figure 11:
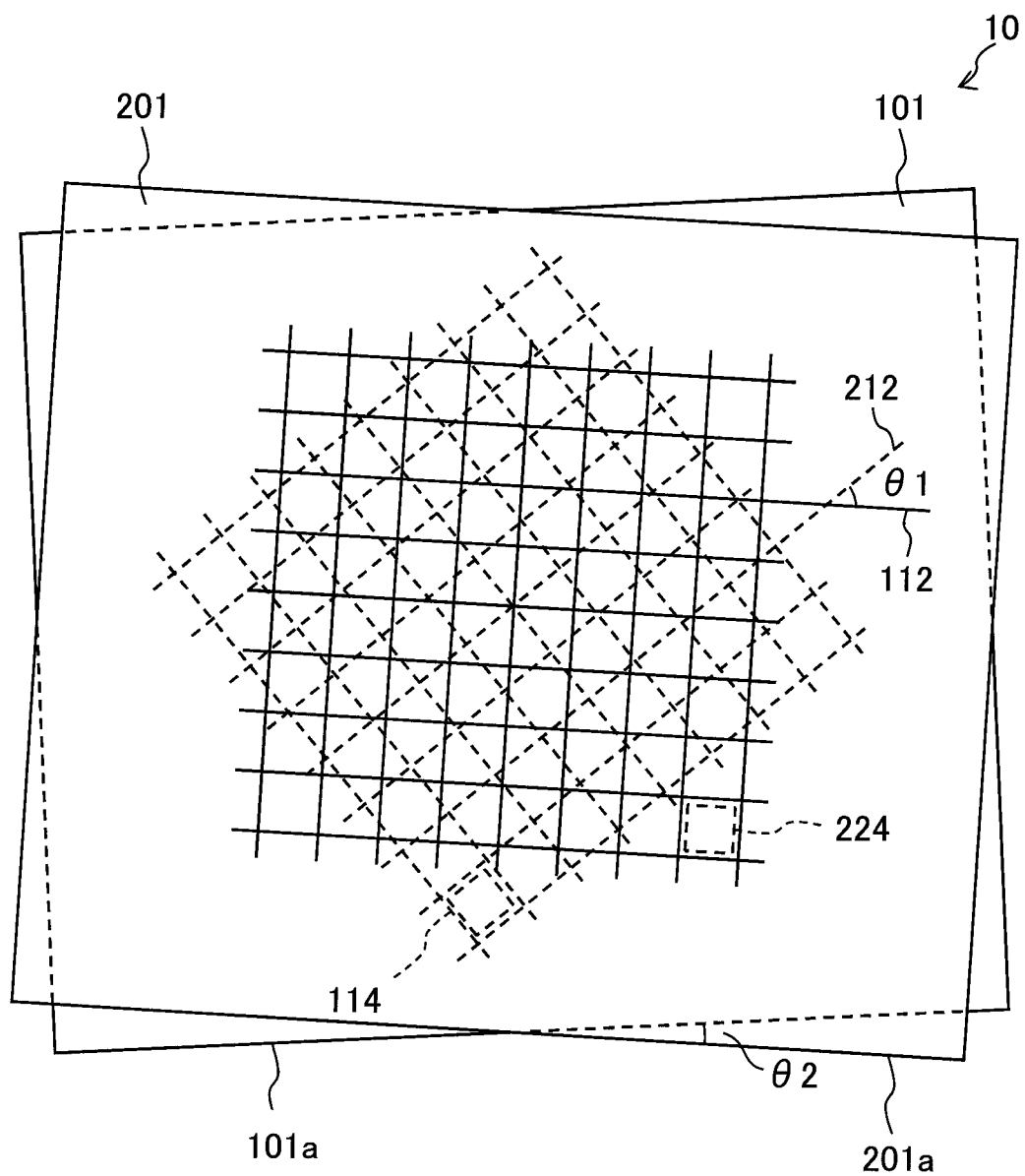
FIG. 11 is a plan view illustrating an arrangement of pixels in the first display panel and the second display panel.

For this reason, a configuration in which the relative angle difference approaches 30 degrees may be provided in addition to the above configuration of first display panel 100. For example, as illustrated in FIG. 11, in first display panel 100 (see FIG. 8) in which the array of pixels 114 is designed to have tan θ=8/15 and cos θ=15/17 and second display panel 200 (see FIG. 10) in which pixels 224 are arrayed in the third and fourth directions such that the relative angle difference θ1 approaches 30 degrees, at least one of first display panel 100 and second display panel 200 may be rotated such that the angle θ2 formed between end side 101a of TFT substrate 101 of first display panel 100 and end side 201a of TFT substrate 201 of second display panel 200 ranges from 1 degree to 3 degrees. For example, first display panel 100 is rotated counterclockwise by 1 degree, and second display panel 200 is rotated clockwise by 1 degree, whereby an angle θ2 may be set to 2 degrees. Consequently, a relative angle difference θ1 becomes 30.07 degrees (=28.07 degrees+2 degrees).

In the configuration of FIG. 10, pixels 224 of second display panel 200 are arrayed in the horizontal direction (X-axis direction) and the vertical direction (Y-axis direction). Alternatively, pixels 224 may be arrayed with the inclination angle similar to pixels 114 of first display panel 100. In this case, the inclination angle is set such that pixels 114 of first display panel 100 and pixels 224 of second display panel 200 are rotated in different directions. For example, in the case that the inclination angle is set such that pixel 114 of first display panel 100 is rotated counterclockwise as illustrated in FIG. 8, the inclination angle of pixel 224 of second display panel 200 is set such that pixel 224 is rotated clockwise. In this case, tan θ may be set so as to satisfy 7/24 in each of first display panel 100 and second display panel 200 such that the relative angle difference θ1 approaches 30 degrees. Consequently, the relative angle difference θ1 becomes 32.53 degrees (=16.26 degrees+ 16.26 degrees).

Preferably the array pitch of the pixels is adjusted in the case that a predetermined number of pixels 114 is disposed in first display panel 100, or in the case that the inclination array pattern of pixels 114 of first display panel 100 is designed using the array pattern (horizontal and vertical arrays) of pixels 224 of second display panel 200. The configuration in which the array pattern of the pixels having the inclination angle in the array direction is designed by adjusting the array pitch of the pixels will be described below. At this point, the case that the inclination angle θ of pixel 114 of first display panel 100 is set to 28.07 degrees (tan θ=8/15, cos θ=15/17) will be described as an example. It is assumed that the plurality of pixels 224 (see FIG. 10) of second display panel 200 are arranged at a 170.4-um pitch in each of the third and fourth directions. The grid interval is 0.05 um. It is assumed that the third direction is matched with the X-axis direction (horizontal direction), and that the fourth direction is matched with the Y-axis direction (vertical direction).

Figure 12:
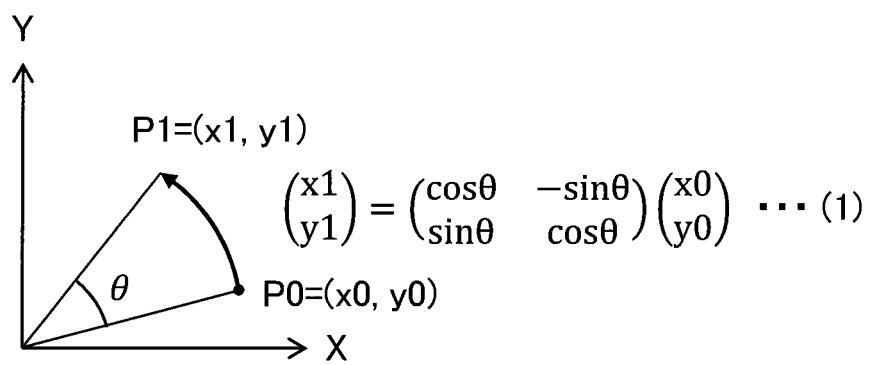
FIG. 12 is a figure illustrating a rotated coordinate in XY coordinate.

In the case that the array pattern in which the pixels are arrayed in the X-axis direction (horizontal direction) and the Y-axis direction (vertical direction) is rotated by 28.07 degrees in designing the array pattern of pixels 114 of first display panel 100, an XY coordinate of the pixels is given by a conversion equation (1) in FIG. 12. In order to place the end of the rotated pixel on the grid, it is necessary that the array pitch of the pixel in the X-axis direction and the Y-axis direction be an integral multiple of 0.85 um (=17×0.05 um). The array pitch of the plurality of pixels for first display panel 100 in the X-axis direction and the Y-axis direction is an integral multiple of 0.85 um, and is set to an approximate value of the array pitch (170.4 um) of pixels 224 of second display panel 200. The plurality of pixels (pixel groups) having different array pitches are combined and arrayed.

Figure 13:
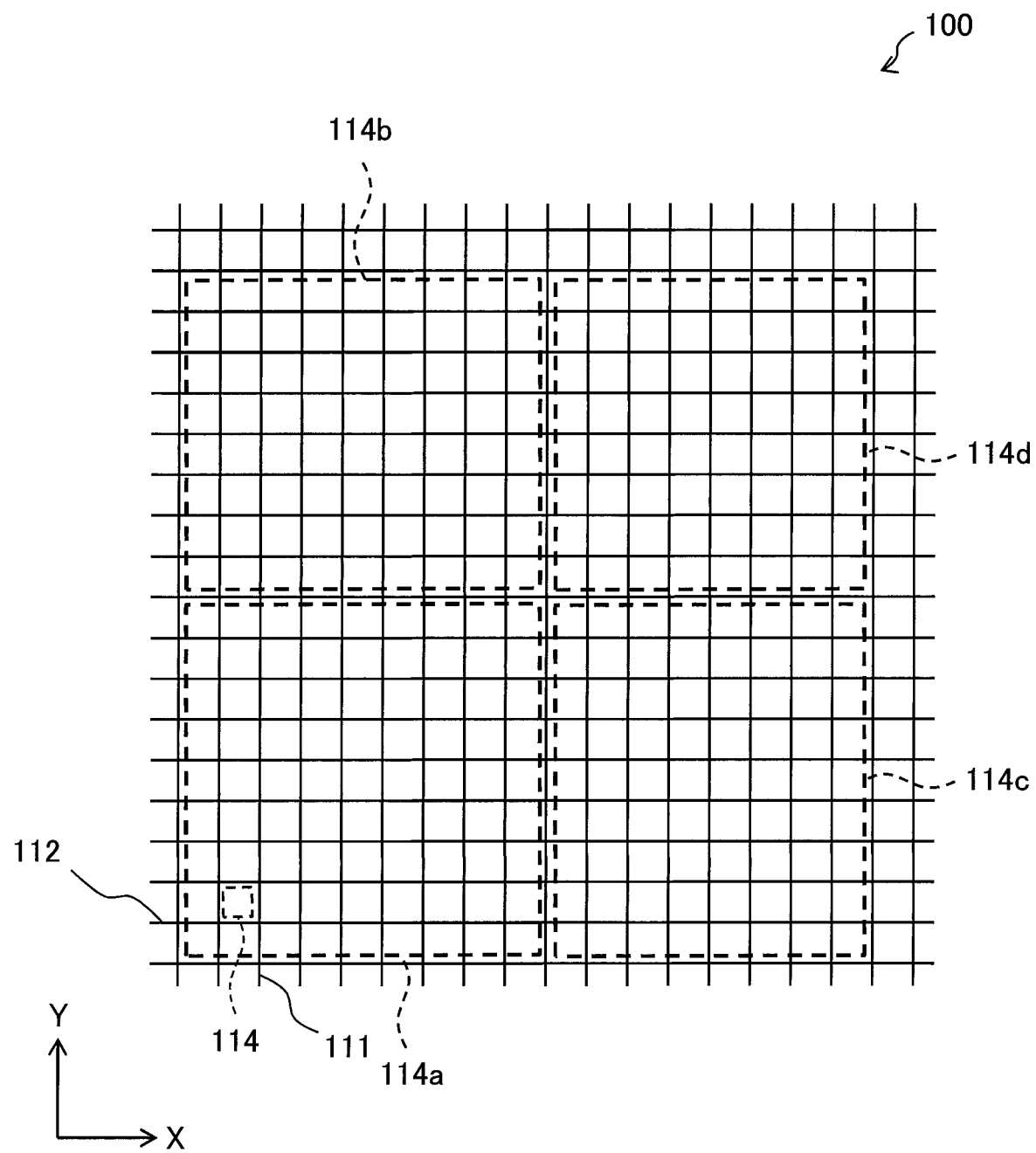
FIG. 13 is a plan view illustrating an arrangement of pixels (before rotating) for the first display panel.
Figure 14:
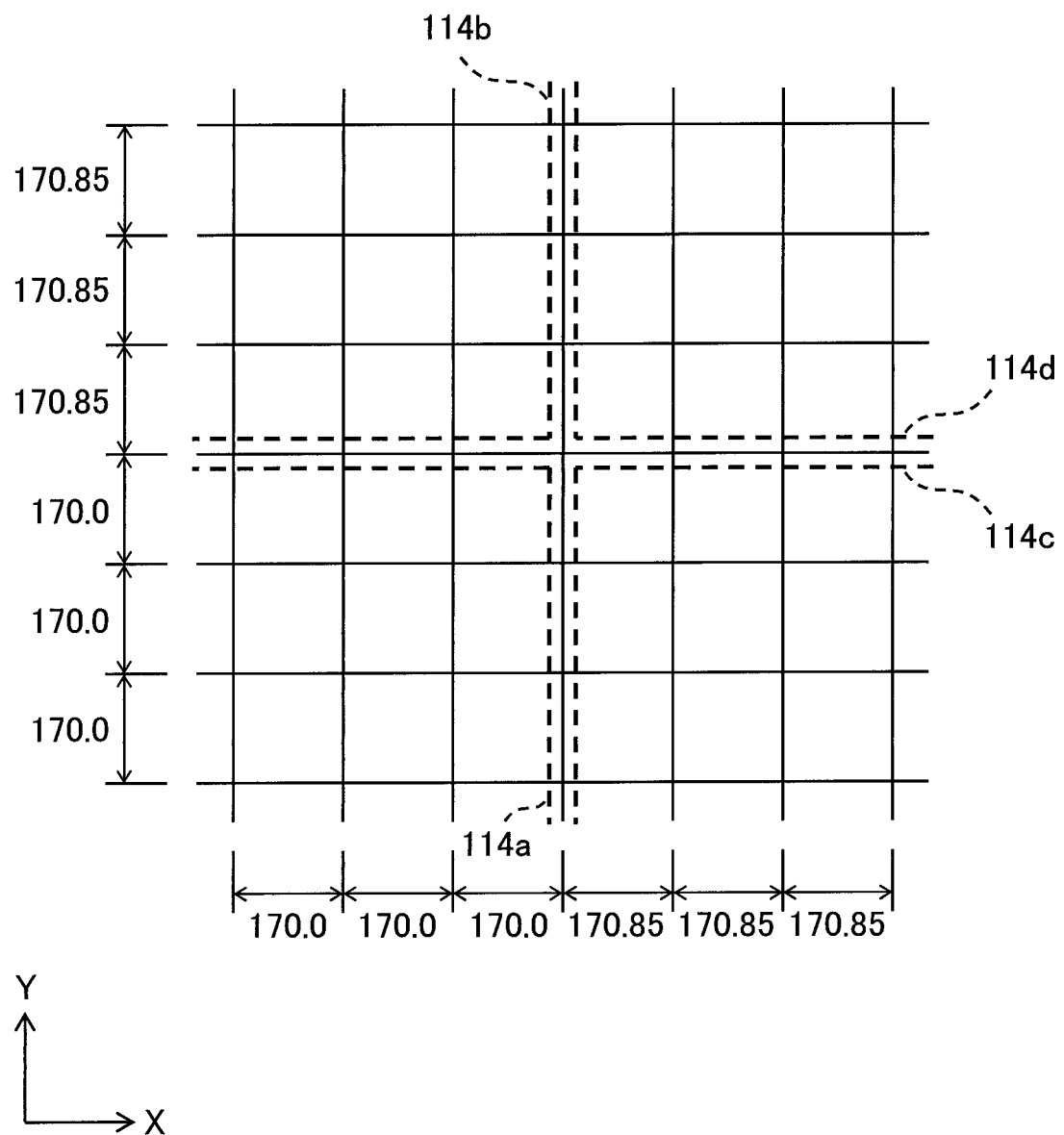
FIG. 14 is a plan view illustrating an array pitch of pixels for the first display panel.

FIG. 13 is a plan view illustrating an example of the array pattern of pixels 114 before the rotation. In the example of FIG. 13, the plurality of pixels 114 (9-by-9 pixel in the case of being represented by "the number of pixels in the X-axis direction" by "the number of pixels in the Y-axis direction") constituting first pixel group 114a are arrayed at a 170.0-um pitch in the X-axis and Y-axis directions, the plurality of pixels 114 (9-by-8 pixel) constituting second pixel group 114b are arrayed at the 170.0-um pitch in the X-axis direction and arrayed at a 170.85-um pitch in the Y-axis direction, the plurality of pixels 114 (8-by-9 pixel) constituting third pixel group 114c are arrayed at the 170.85-um pitch in the X-axis direction and arrayed at a 170.0-um pitch in the Y-axis direction, and the plurality of pixels 114 (8-by-8 pixel) constituting fourth pixel group 114d are arrayed at the 170.85-um pitch in the X-axis direction and Y-axis directions. FIG. 14 illustrates the array pitch of the plurality of pixels 114 at the boundary portion of each pixel group.

In the two pixel groups (for example, first pixel group 114a and third pixel group 114c) disposed adjacent to each other in the X-axis direction, the array pitches of the plurality of pixels 114 in the X-axis direction are different from each other, and the array pitches in the Y-axis direction are equal to each other. In the two pixel groups (for example, first pixel group 114a and second pixel group 114b) disposed adjacent to each other in the Y-axis direction, the array pitches of the plurality of pixels 114 in the Y-axis direction are different from each other, and the array pitches in the X-axis direction are equal to each other.

In the second display panel 200 (see FIG. 10), the array pitches of the plurality of pixels 224 in the third direction (X-axis direction) are equal to each other, and the array pitches in the fourth direction (Y-axis direction) are equal to each other. For example, the plurality of pixels 224 are arrayed at a 170.4-μm pitch in the third and fourth directions. As described above, the array pitch (170.4 μm) in the X-axis direction of the plurality of pixels 224 arranged in second display panel 200 is larger than the array pitch (170.0 μm) in the X-axis direction of the plurality of pixels 114 constituting first pixel group 114a for first display panel 100, and is smaller than the array pitch (170.85 μm) in the X-axis direction of the plurality of pixels 114 constituting third pixel group 114c. Similarly, the array pitch (170.4 μm) in the Y-axis direction of the plurality of pixels 224 arranged in second display panel 200 is larger than the array pitch (170.0 μm) in the Y-axis direction of the plurality of pixels 114 constituting first pixel group 114a for first display panel 100, and is smaller than the array pitch (170.85 μm) in the Y-axis direction of the plurality of pixels 114 constituting second pixel group 114b.

In the array pattern of pixels 114 for first display panel 100, 17-by-17 pixel units each of which is constructed with first pixel group 114a, second pixel group 114b, third pixel group 114c, and fourth pixel group 114d are arrayed in the X-axis and Y-axis directions. That is, first pixel group 114a and third pixel group 114c are alternately arrayed in the X-axis direction, and second pixel group 114b and fourth pixel group 114d are alternately arrayed in the X-axis direction, first pixel group 114a and second pixel group 114b are alternately arrayed in the Y-axis direction, and third pixel group 114c and fourth pixel group 114d are alternately arrayed in the Y-axis direction.

The numbers of pixels 114 included in each pixel group are different from each other. For example, first pixel group 114a includes 81 pixels 114, and second pixel group 114b includes 72 pixels 114. As illustrated in second pixel group 114b and third pixel group 114c in FIG. 13, pixel groups having the same number of pixels may be included.

Figure 15:
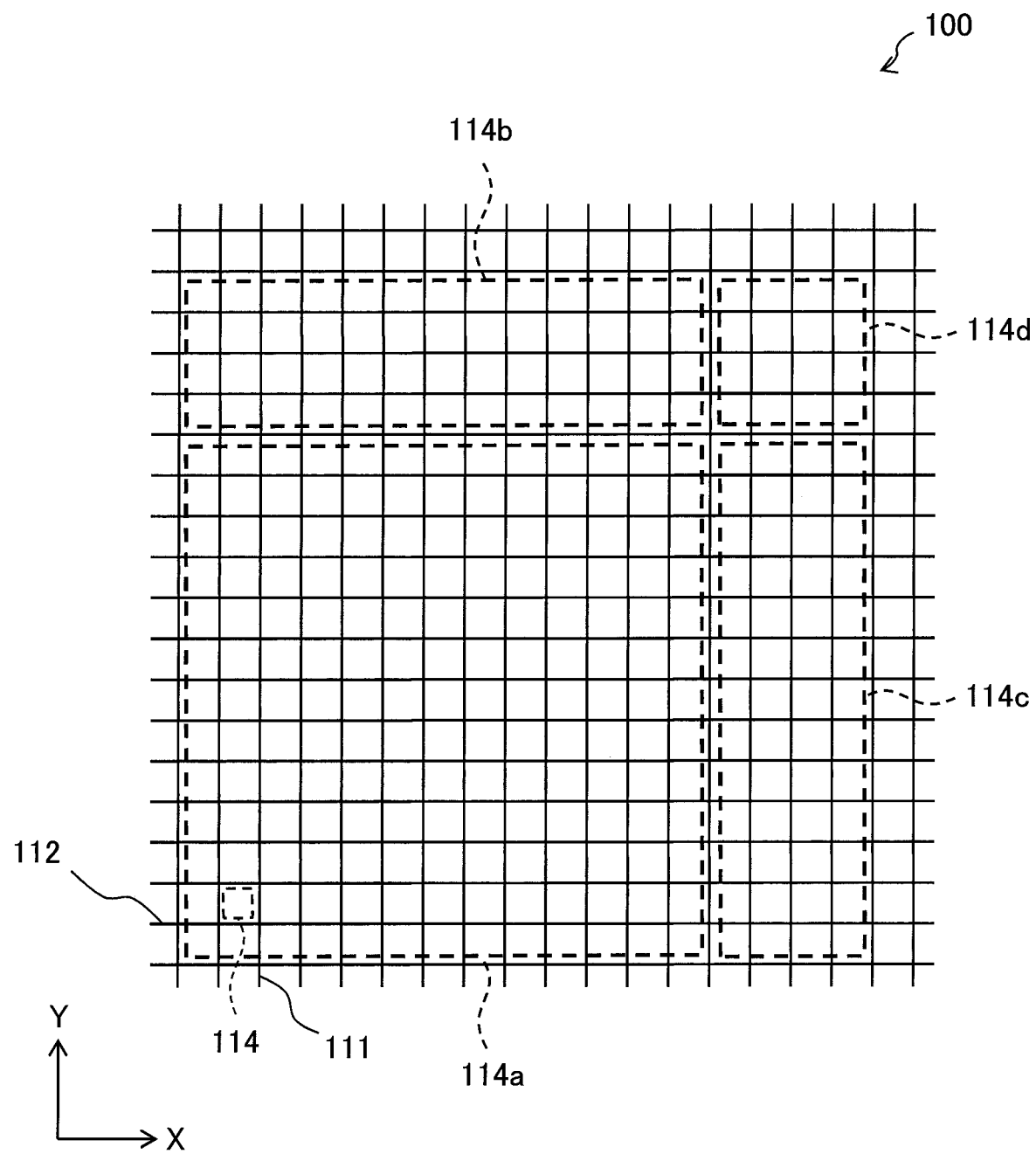
FIG. 15 is a plan view illustrating another arrangement of pixels (before rotating) for the first display panel.

The number of pixels in each pixel group is not limited to the above example. For example, as illustrated in FIG. 15, first pixel group 114a may be constructed with 13-by-13 pixels, second pixel group 114b may be constructed with 13-by-4 pixels, third pixel group 114c may be constructed with 4-by-13 pixels, and fourth pixel group 114d may be constructed with 4-by-4 pixels.

Figure 16:
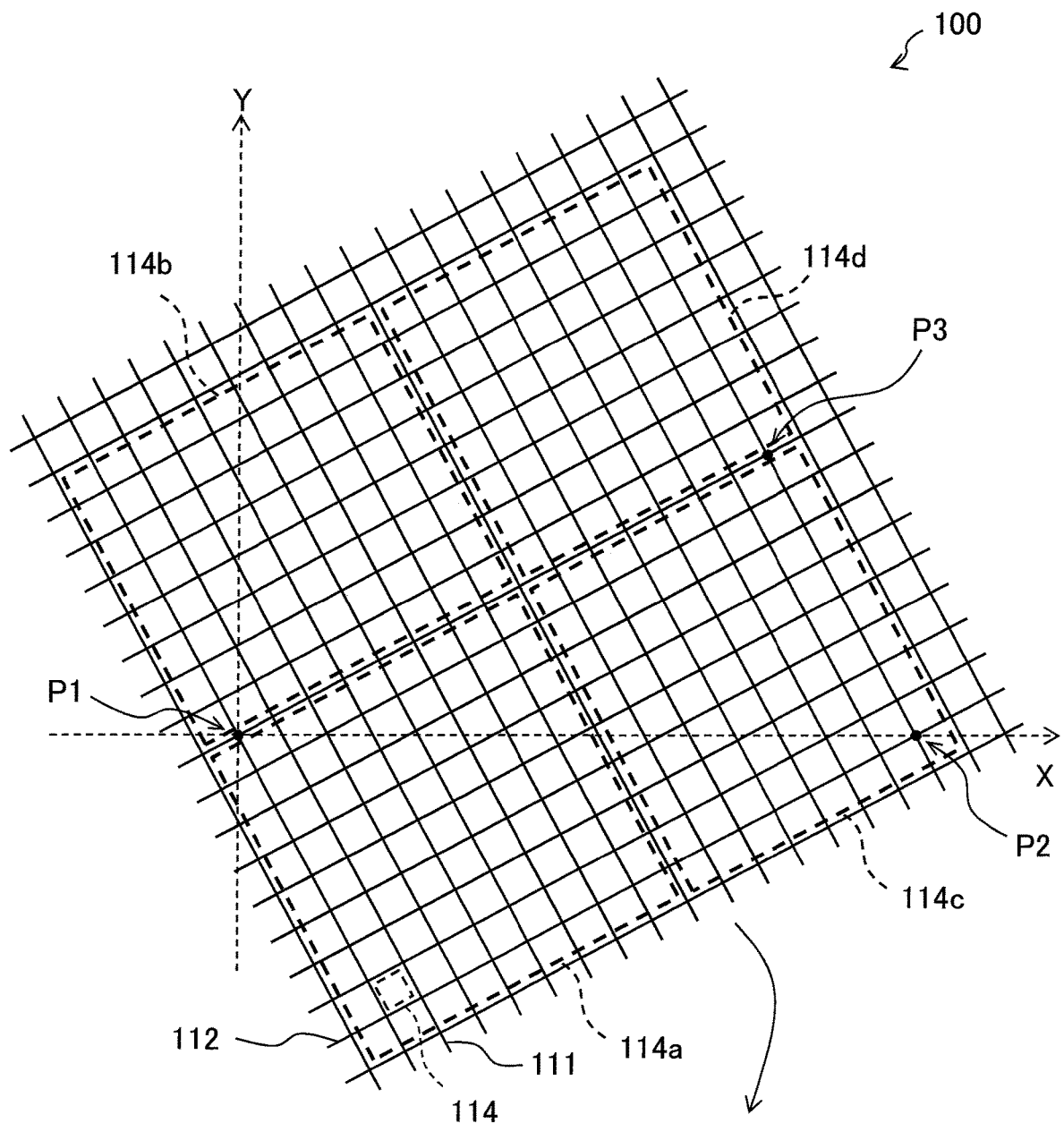
FIG. 16 is a plan view illustrating an arrangement of pixels (after rotating) in the first display panel.

FIG. 16 illustrates a state in which the pixel unit (see FIG. 13) including first pixel group 114a, second pixel group 114b, third pixel group 114c, and fourth pixel group 114d is rotated by 28.07 degrees. In the state of FIG. 16, in the right triangle, tan θ satisfies 8/15, cos θ satisfies 15/17, length L, length M, and length N are the rational numbers, and length L is an integral multiple of the grid interval (in this case, 0.05 um).

In the above configuration, the end of pixel 114 is placed on the grid by the simple method, so that the work efficiency can be improved in inclining the array direction of pixels 114. First display panel 100 having the inclination angle in the pixel array direction can easily be prepared using the plurality of pixels arrayed in the horizontal direction (X-axis direction) and the vertical direction (Y-axis direction).

In each of the above configurations, gate line 112 extends in the first direction and data line 111 extends in the second direction in first display panel 100, and gate line 212 extends in the third direction and data line 211 extends in the fourth direction in second display panel 200. Alternatively, gate line 112 may extend in the second direction and data line 111 may extend in the first direction in first display panel 100, and gate line 212 may extend in the fourth direction and data line 211 may extend in the third direction in second display panel 200.

Figure 17A:
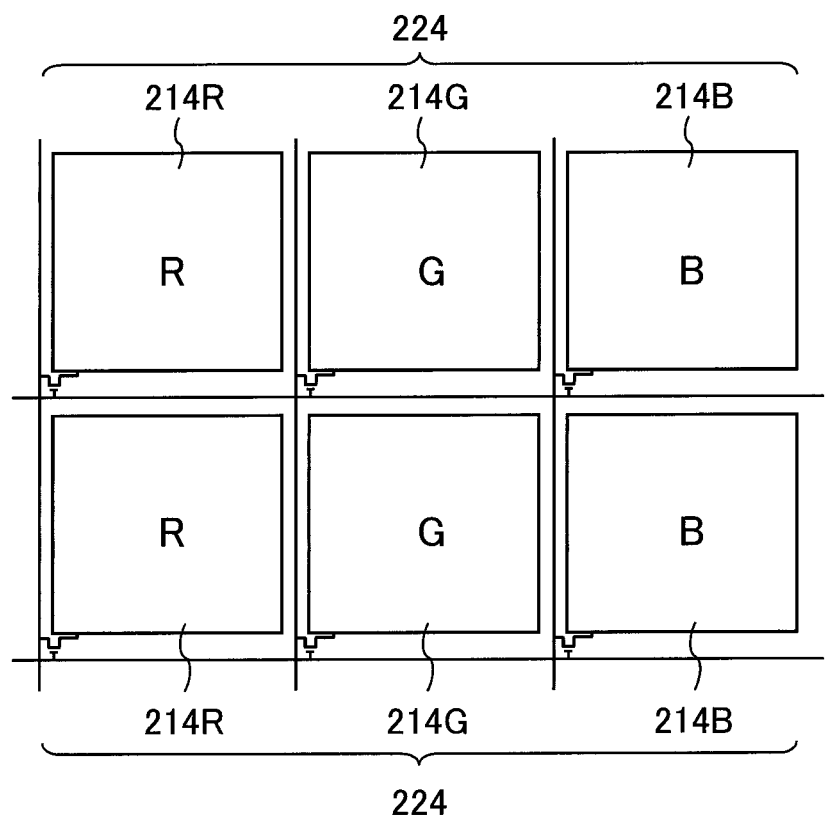
FIG. 17A is a plan view illustrating an arrangement of pixels in second display panel according to the exemplary embodiment.
Figure 17B:
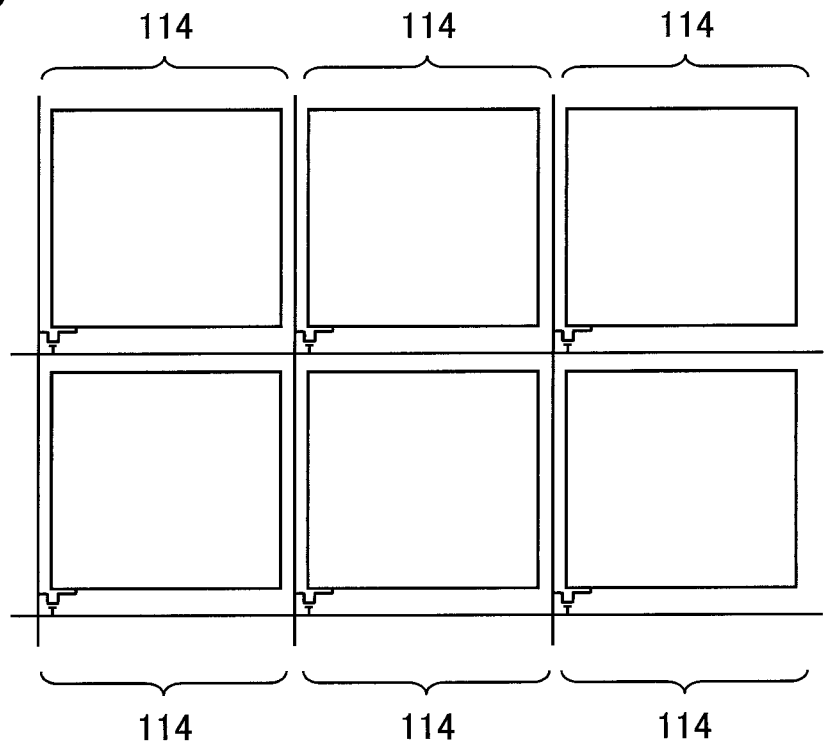
FIG. 17B is a plan view illustrating an arrangement of pixels in first display panel according to the exemplary embodiment.

Liquid crystal display device 10 of the exemplary embodiment is not limited to the above configuration. For example, the relationship of the arrangement of the respective pixels of the first display panel 100 and the second display panel 200 is not limited to the configuration illustrated in FIG. 7, and may be, for example, the configuration illustrated in FIG. 17. In a configuration of FIG. 17, the area of pixel 114 of first display panel 100 is equal to the area of subpixel 214 of second display panel 200.

In liquid crystal display device 10 of the exemplary embodiment, both first display panel 100 and second display panel 200 may display the color image, and one of first display panel 100 and second display panel 200 may be configured to have the inclination angle in the array direction of the pixels. In this configuration, polarizing plate 105 of first display panel 100 and polarizing plate 204 of second display panel 200 may be omitted. A gap may be formed between first display panel 100 and second display panel 200. In the above configuration, liquid crystal display device 10 can be used as a three-dimensional (3D) image display device.

Liquid crystal display device 10 of the exemplary embodiment may be constructed with one display panel having the inclination angle in the array direction of the pixels by the above method. In this case, the display panel may have a configuration that displays the color image or may have a configuration that displays the monochrome image.

In liquid crystal display device 10 of the exemplary embodiment, a diffusion sheet may be disposed between polarizing plate 105 (see FIG. 6) of first display panel 100 and polarizing plate 204 (see FIG. 6) of second display panel 200 in order to enhance the effect that prevents the generation of the moire.

In the above, the specific embodiments of the present application have been described, but the present application is not limited to the above-mentioned embodiments, and various modifications may be made as appropriate without departing from the spirit of the present application.

The invention claimed is:

1. A display device comprising a display panel in which a plurality of pixels are arranged in a matrix form, wherein
the plurality of pixels include a plurality of first pixels and a plurality of second pixels arrayed at a pitch different from an array pitch of the plurality of first pixels, a number of the plurality of first pixels is different from a number of the plurality of second pixels,
the plurality of pixels are arranged in the matrix form in a first direction and a second direction,
the display panel includes a substrate, and
the first direction and the second direction are inclined with respect to an end side of the substrate.

2. The display device according to claim 1, wherein
the plurality of first pixels and the plurality of second pixels are equal to each other in the array pitch in the first direction, and
the plurality of first pixels and the plurality of second pixels are different from each other in the array pitch in the second direction.

3. The display device according to claim 1, wherein a first pixel group constructed with a plurality of the first pixels arrayed adjacent to each other and a second pixel group constructed with a plurality of the second pixels arrayed adjacent to each other are alternately arrayed.

4. The display device according to claim 3, wherein the number of the plurality of first pixels included in the first pixel group and the number of the plurality of second pixels included in the second pixel group are different from each other.

5. The display device according to claim 2, wherein
the plurality of pixels further include a plurality of third pixels and a plurality of fourth pixels,
the plurality of first pixels and the plurality of third pixels are equal to each other in the array pitch in the second direction,
the plurality of first pixels and the plurality of third pixels are different from each other in the array pitch in the first direction,
the plurality of second pixels and the plurality of fourth pixels are equal to each other in the array pitch in the second direction, the plurality of second pixels and the plurality of fourth pixels are different from each other in the array pitch in the first direction, the plurality of third pixels and the plurality of fourth pixels are equal to each other in the array pitch in the first direction, and the plurality of third pixels and the plurality of fourth pixels are different from each other in the array pitch in the second direction.

6. The display device according to claim 5, wherein the number of the plurality of second pixels and the number of the plurality of third pixels are different from each other, and the number of the plurality of third pixels and the number of the plurality of fourth pixels are different from each other.

7. A display device comprising a first display panel and a second display panel that are arranged to overlap each other in planar view, wherein in the first display panel, a plurality of pixels are arranged in a matrix form in a first direction and a second direction, in the second display panel, a plurality of pixels are arranged in a matrix form in a third direction and a fourth direction, the plurality of pixels arranged in the first display panel includes a plurality of first pixels and a plurality of second pixels, the plurality of first pixels and the plurality of second pixels are equal to each other in an array pitch in the first direction, the plurality of first pixels and the plurality of second pixels are different from each other in an array pitch in the second direction, in the plurality of pixels arranged in the second display panel, the array pitches in the third direction are equal to each other, and the array pitches in the fourth direction are equal to each other, and the array pitch in the fourth direction of the plurality of pixels arranged in the second display panel is larger than one of the array pitch in the second direction of the plurality of first pixels and the array pitch in the second direction of the plurality of second pixels, and is smaller than the other of the array pitch in the second direction of the plurality of first pixels and the array pitch in the second direction of the plurality of second pixels.

8. The display device according to claim 7, wherein the second direction is inclined by 28 degrees to 32 degrees with respect to the fourth direction.

9. A display device comprising a display panel in which a plurality of rectangular pixels each of which includes a pair of sides extending in a first direction and a pair of sides extending in a second direction are arranged in a matrix form in the first direction and the second direction, wherein the plurality of pixels include a first pixel, a second pixel, and a third pixel, and assuming that $\theta$ is an angle formed between a first side and a third side when a right triangle constructed with the first side that connects a first end of the first pixel and the second end of the second pixel and extends in the first direction, a second side that connects the second end and a third end of the third pixel and extends in the second direction, and the third side that connects the first end and the third end and is parallel to an end side of a substrate constituting the display panel is formed with the first end, the second end, and the third end as vertices, $\tan \theta$ and $\cos \theta$ are rational numbers.

10. The display device according to claim 9, wherein the $\tan \theta$ satisfies any one of $3/4$, $5/12$, $8/15$, $7/24$, $20/21$, $12/35$, $9/40$, $28/45$, $11/60$, $16/63$, and $33/56$.

11. The display device according to claim 9, wherein the $\tan \theta$ satisfies any one of $3/4$, $5/12$, $8/15$, $7/24$, and $20/21$.

12. The display device according to claim 9, wherein the display panel includes a plurality of data lines and a plurality of gate lines, and the plurality of data lines or the plurality of gate lines are inclined by the angle $\theta$ with respect to the end side of the substrate.

13. The display device according to claim 9, wherein the display panel includes a plurality of gate lines extending in the first direction and a plurality of data lines extending in the second direction, and a length of the first side is an integral multiple of an array pitch of the plurality of data lines, and a length of the second side is an integral multiple of an array pitch of the plurality of gate lines.

* * * * *